(12) United States Patent
Baker et al.

(10) Patent No.: US 10,760,213 B2
(45) Date of Patent: *Sep. 1, 2020

(54) METHOD OF DIRECTED FOULING OF A SUBSTANCE ONTO A SELECTED SURFACE

(71) Applicant: RENMATIX, INC., King of Prussia, PA (US)

(72) Inventors: Raymond P. Baker, Hatboro, PA (US); David John Biondo, Philadelphia, PA (US); Daniel Clay Floyd, North Chesterfield, VA (US); Jay Fingeret Miller, Downingtown, PA (US); Charles Sebastian Sanderson, Wayne, PA (US)

(73) Assignee: Renmatix, Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/700,755

(22) Filed: Dec. 2, 2019

(65) Prior Publication Data
US 2020/0102701 A1    Apr. 2, 2020

Related U.S. Application Data

(63) Continuation of application No. 15/552,399, filed as application No. PCT/US2015/019110 on Mar. 6, 2015, now Pat. No. 10,494,764.

(51) Int. Cl.
| | |
|---|---|
| *D21C 9/00* | (2006.01) |
| *C09D 105/00* | (2006.01) |
| *C09D 197/00* | (2006.01) |
| *D21C 9/08* | (2006.01) |
| *D21H 21/02* | (2006.01) |
| *B08B 7/00* | (2006.01) |
| *B08B 9/08* | (2006.01) |
| *B01J 19/02* | (2006.01) |
| *C13K 1/02* | (2006.01) |

(52) U.S. Cl.
CPC .............. *D21C 9/00* (2013.01); *B01J 19/02* (2013.01); *B08B 7/0021* (2013.01); *B08B 9/08* (2013.01); *C09D 105/00* (2013.01); *C09D 197/005* (2013.01); *C13K 1/02* (2013.01); *D21C 9/08* (2013.01); *D21H 21/02* (2013.01); *B01J 2219/029* (2013.01); *B01J 2219/0254* (2013.01)

(58) Field of Classification Search
None
See application file for complete search history.

(56) References Cited

U.S. PATENT DOCUMENTS 6,454,456 B2 * 9/2002 Browne .............. A47J 43/1093
366/129

FOREIGN PATENT DOCUMENTS

GB      2347094 A  *  8/2000   ............ A47J 43/082

* cited by examiner

*Primary Examiner* — Stefanie J Cohen
(74) *Attorney, Agent, or Firm* — Ballard Spahr LLP (57) ABSTRACT

Provided is a method for directed fouling of a substance onto a selected surface. Also provided is an apparatus suitable for directed fouling of a substance onto a selected surface.

19 Claims, 2 Drawing Sheets

METHOD OF DIRECTED FOULING OF A SUBSTANCE ONTO A SELECTED SURFACE

CROSS-REFERENCE TO RELATED APPLICATIONS

This Application is a continuation of U.S. application Ser. No. 15/552,399, filed on Aug. 21, 2017, now U.S. Pat. 10,494,764 which is a U.S. National Phase Application of International Patent Application No. PCT/US2015/019110, filed on Mar. 6, 2015, the contents of which are herein incorporated by reference in theft entireties.

BACKGROUND OF THE INVENTION

Lignocellulosic feedstocks (e.g. lignocellulosic biomass) comprise mainly cellulose, hemicelluloses, and lignin. Lignocellulosic feedstocks typically are obtained from renewable resources, such as agriculture, forests, and refineries associated therewith and are not considered to be food sources. In view of these aspects, lignocellulosic feedstocks are considered desirable for the production of biofuels, chemicals, and polymers.

Existing methods delignify lignocellulosic feedstocks before entering the cellulose conversion process using solvents or other chemicals. In such delignification processes, complex equipment typically is required, which is expensive to operate because of solvent or chemical usage. In other existing processes, the conversion of lignocellulosic biomass in pretreatment and hydrolysis steps requires high temperatures to fully or partially solubilize the lignin present. Upon cooling, the lignin precipitates from solution, which may be recovered from the process and burned for thermal energy or used in other product applications. Furthermore, in certain temperature ranges the lignin becomes sticky and tends to foul the process equipment to the point of making the process inoperable.

Thus, despite existing methods, there continues to be a need for improved methods for processing lignocellulosic feedstocks, including economical recovery of lignin, with reduced fouling of the reactor tanks or vessels.

BRIEF SUMMARY OF THE INVENTION

In some embodiments, a method is provided for directed fouling of a substance onto a selected surface. Directed fouling of a substance refers to the selective deposition of a substance (e.g., a foulant) onto at least a portion of a surface. Typically, one surface has a higher or greater propensity to foul relative to the propensity of other surfaces that may be present under any given set of conditions. Directed fouling allows for streamlined processing, because fouling is directed to certain desired portions of reaction tanks or vessels, thereby allowing the remaining portions of these vessels to remain free of fouling or only become fouled to a lesser extent. As such, processing operations can continue indefinitely or for a longer period of time than without the methods disclosed herein. Moreover, the processing can be continuous, because the selected surface that is preferentially fouled can, if desired, be removed, cleaned, and reinserted to allow for further processing, or may be cleaned in situ by a variety of techniques. Moreover, the processing can be continuous because a given material or feedstock is processed continuously in a vessel (i.e., not processing in batch mode). In view of these considerations, it is envisioned that process improvements, such as those provided by the inventive method, save time, energy, and/or production costs.

In some embodiments, a method is provided comprising processing a substance in the presence of a first object, depositing a foulant derived from the substance on at least a portion of the first object, and cleaning at least a portion of the foulant from the first object.

In some embodiments, an apparatus is provided that is suitable for directed fouling of a substance onto a selected surface.

DETAILED DESCRIPTION OF THE INVENTION

In some embodiments, a method is provided comprising providing a vessel having an inner surface, processing a substance in the vessel in the presence of a first object having a first surface, depositing a foulant on at least a portion of the first surface during the processing, thereby producing a fouled first object, and cleaning at least a portion of the foulant from the fouled first object, wherein at least a portion of the inner surface has a first propensity to foul, at least a portion of the first surface has a second propensity to foul, and the first propensity is lower than the second propensity. Given the nature of the foulant, both the vessel and the first object have the ability to become fouled during the processing. However, because the first propensity is lower than the second propensity, the first object is fouled preferentially over the inner surface of the vessel, thereby allowing the foulant to be preferentially removed from the system via the first object. By choosing the materials of construction to preferentially foul a selected object or surface, the foulant can be more easily and more predictably handled. As a result, the inventive method improves the processing (lowers costs, reduces down time due to equipment fouling, potentially shortens processing time, etc.) of the substance, because the foulant is selectively deposited onto the surface of the first object.

As used herein, "at least a portion" of a given surface means a portion of the surface (i.e., not all), or it means the entire surface. For example, "at least a portion" of a given surface means at least about 1% by surface area, e.g., at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, or about 100% (or 100%) by surface area. Alternatively, or in addition, "at least a portion" of a given surface means less than about 100% by surface area, e.g., less than about 95%, less than about 90%, less than about 85%, less than about 80%, less than about 75%, less than about 70%, less than about 65%, less than about 60%, less than about 55%, less than about 50%, less than about 45%, less than about 40%, less than about 35%, less than about 30%, less than about 25%, less than about 20%, less than about 15%, less than about 10%, or less than about 5% by surface area.

In some embodiments, the substance is any suitable substance that can be processed in accordance with the method and/or apparatus disclosed herein. Typically, the substance is in direct contact with both the inner surface of the vessel and the first surface of the first object. In some embodiments, the substance is in solid form, liquid form, in solution, in gas form, in supercritical form, or any combination thereof. In some embodiments, the substance is, comprises, or is derived from, a component of lignocellulosic biomass (e.g., cellulose, hemicelluloses sugars, and/or lignin) or a food (e.g., milk or a milk product). In some embodiments, the substance is biomass, an oligosaccharide, a polysaccharide, lignin, a food product, or any combination thereof. In some embodiments, the biomass is lignocellulosic biomass.

As used herein, biomass refers to any renewable energy source generally comprising carbon-based biological material derived from living or recently-living organisms. The biomass can be from any biomass (e.g., lignocellulosic biomass), such as plants (e.g., duckweed, annual fibers, etc.), trees (softwood, e.g., fir, pine, spruce, etc.; tropical wood, e.g., balsa, iroko, teak, etc.; or hardwood, e.g., elm, oak, aspen, pine, poplar, willow, eucalyptus, etc.), bushes, grass (e.g., miscanthus, switchgrass, rye, reed canary grass, giant reed, or sorghum), dedicated energy crops, municipal waste (e.g., municipal solid waste), and/or a by-product of an agricultural product (e.g., corn, sugarcane, sugar beets, pearl millet, grapes, rice, straw). The biomass can be from a virgin source (e.g., a forest, woodland, or farm) and/or a by-product of a processed source (e.g., off-cuts, bark, and/or sawdust from a paper mill or saw mill, sugarcane bagasse, corn stover, palm oil industry residues, branches, leaves, roots, hemp, pulping liquids (e.g., black liquor), or any combination thereof). Lignocellulosic biomass is a plant biomass containing cellulose, hemicelluloses, and lignin from a variety of sources, including, without limitation, (1) agricultural residues (including corn stover and sugarcane bagasse), (2) dedicated energy crops, (3) wood residues (including sawmill and paper mill discards), (4) municipal waste, and their constituent parts including without limitation, lignocellulosic biomass itself, lignin, $C_6$ saccharides (including cellulose, cellobiose, $C_6$ oligosaccharides, $C_6$ monosaccharides, and $C_5$ saccharides (including hemicellulose, $C_5$ oligosaccharides, and $C_5$ monosaccharides), or (5) any combination thereof.

In some embodiments, the method comprises pretreating the lignocellulosic biomass to reduce the size of the lignocellulosic biomass prior to or during the processing step. The size reduction of the lignocellulosic biomass is conducted using any suitable method. In some embodiments, the size reduction of the lignocellulosic biomass is conducted by grinding, milling, steam explosion, or any combination thereof.

As used herein with respect to biomass, "steam exploding" means a thermomechanochemical process used to break down the structural components of the biomass aided by heat in the form of steam (thermo), shear forces due to the expansion of moisture (mechano), and hydrolysis of glycosidic bonds (chemical). In a reactor, steam under high pressure penetrates the lignocellulosic structures due to a pressure differential, or by convection or diffusion. The steam may also simply heat water already present within the interstitial spaces of the biomass itself, thereby forming hot water and/or steam in the interstitial spaces. In the case of steam, the steam condenses under the high pressure, thereby "wetting" the material (in the case of hot water, the material will already be "wetted"). The water in the biomass hydrolyzes the acid functionalities of the hemicellulose, forming free organic acids, such as acetic acid. Acid byproducts may also form, such as formic acid. The acids, in turn, catalyze the depolymerization of hemicellulose, releasing xylo-oligosaccharides and limited amounts of gluco-oligosaccharides. Under extreme conditions, the amorphous regions of cellulose may be hydrolyzed to some degree. Excessive conditions, i.e., high temperatures and pressures for long periods of time, however, can also promote the degradation of xylose to furfural and glucose to 5-hydroxymethyl furfural. The "wet" biomass is "exploded" when the pressure within the reactor is released. Several phenomena occur at this point. First, the condensed moisture within the structure evaporates instantaneously due to the sudden decrease in pressure. The expansion of the water vapor exerts a shear force on the surrounding structure. If this shear force is high enough, the expanding vapor will cause the mechanical breakdown of the lignocellulosic structures.

In some embodiments, the lignocellulosic biomass is unfractionated. In some embodiments, the lignocellulosic biomass is fractionated. As used herein, biomass is "fractionated" when it has been subjected to a treatment process, whereby hemicellulose has been at least partially removed from the biomass.

The saccharide and oligosaccharide are not particularly limited and can be any suitable saccharide or oligosaccharide amenable to the inventive method. Typically, the saccharide or oligosaccharide is or comprises $C_6$ saccharides (including cellulose, $C_6$ oligosaccharides, $C_6$ monosaccharides) and $C_5$ saccharides (including hemicellulose, $C_5$ oligosaccharides, and $C_5$ monosaccharides). Other illustrative polysaccharides include, for example, xylans (e.g., xylan, glucuronoxylan, arabinoxylan, glucomannan, and xyloglucan). These polysaccharides and oligosaccharides can contain different sugar monomers including, for example, glucose, xylose, mannose, galactose, rhamnose, and/or arabinose. Hemicelluloses contain most of the D-pentose sugars, and occasionally small amounts of L-sugars as well. Xylose typically is present in the largest amount in hardwood hemicellulose, whereas in softwoods mannose can be the most abundant hemicellulosic sugar. Also found in hemicelluloses is the acidified form of the sugar, for instance glucuronic acid and galacturonic acid.

In some embodiments, the substance is or comprises food or a food product. An illustrative food or food product includes, for example, a milk product (e.g., a milk protein, casein, curd, cheese, milk, and the like), egg, protein (e.g., denaturable protein, liquid protein, solid protein, protein in solution, and the like), or any combination thereof.

In some embodiments, the processing is performed in the presence of one or more fluids, including, for example, water (e.g., hot compressed water), organic fluid (e.g. methanol, ethanol, propanol, etc.) sub-critical fluid, near-critical fluid, and/or supercritical fluid (e.g., supercritical water, supercritical carbon dioxide, supercritical ethanol, etc.). In some embodiments, the substance is provided as a solid-liquid slurry.

In some embodiments, the substance is present in a mixture of solids and fluid (e.g., liquid) during the processing, and the total solids content of the mixture is about 1 wt.

% or more, e.g., about 2 wt. % or more, about 4 wt. % or more, about 6 wt. % or more, about 8 wt. % or more, about 10 wt. % or more, about 12 wt. % or more, about 14 wt. % or more, about 16 wt. % or more, about 18 wt. % or more, about 20 wt. % or more, about 22 wt. % or more, about 24 wt. % or more, about 26 wt. % or more, about 28 wt. % or more, about 30 wt. % or more, about 35 wt. % or more, about 40 wt. % or more, about 45 wt. % or more, or about 50 wt. % or more. While the maximum total solids content of the mixture is not particularly limited, it is desirable that the maximum total solids content is such that the mixture and/or substance can be suitably processed. The maximum total solids content typically is 50 wt. % or less, e.g., 45 wt. % or less, 40 wt. % or less, 35 wt. % or less, 30 wt. % or less, 28 wt. % or less, 26 wt. % or less, 24 wt. % or less, 22 wt. % or less, 20 wt. % or less, 18 wt. % or less, 16 wt. % or less, 14 wt. % or less, 12 wt. % or less, 10 wt. % or less, 8 wt. % or less, 6 wt. % or less, 4 wt. % or less, or 2 wt. % or less. These lower and upper limits can be used in any combination to describe the total solids content of the mixture.

A supercritical fluid is a fluid at a temperature at or above its critical temperature and at a pressure at or above its critical pressure. A supercritical fluid exists at or above its "critical point," i.e., the point of highest temperature and pressure at which the liquid and vapor (gas) phases can exist in equilibrium with one another. Above critical pressure and critical temperature, the distinction between liquid and gas phases disappears. A supercritical fluid possesses approximately the penetration properties of a gas simultaneously with the solvent properties of a liquid. Accordingly, supercritical fluid extraction has the benefit of high penetrability and good solvation.

For pure water, reported critical temperatures and pressures include a critical temperature of about 374.2° C. and a critical pressure of about 221 bar (22,100 kPa). Near critical water has a temperature at or above about 300° C. and below the critical temperature of water (374.2° C.), and a pressure high enough to ensure that the water is in the liquid phase. Sub-critical water has a temperature of less than about 300° C. and a pressure high enough to ensure that the water is in the liquid phase. Sub-critical water temperature may be greater than about 250° C. and less than about 300° C., and in many instances sub-critical water has a temperature between about 250° C. and about 280° C. The term "hot compressed water" is used interchangeably herein for water that is at or above its critical state, or defined herein as near-critical or sub-critical, or any other temperature above about 50° C. (preferably, at least about 100° C., at least about 150° C., at least about 200° C.) but less than sub-critical and at pressures such that water is in a liquid state.

As used herein, a fluid which is "supercritical" (e.g., supercritical water) indicates a fluid which would be supercritical if present in pure form under a given set of temperature and pressure conditions. For example, "supercritical water" indicates water present at a temperature of at least about 374.2° C. and a pressure of at least about 221 bar, whether the water is pure water, or present as a mixture (e.g. water and ethanol, water and CO2, etc.). Thus, for example, "a mixture of sub-critical water and supercritical carbon dioxide" indicates a mixture of water and carbon dioxide at a temperature and pressure above that of the critical point for carbon dioxide but below the critical point for water, regardless of whether the supercritical phase contains water and regardless of whether the water phase contains any carbon dioxide. For example, a mixture of sub-critical water and supercritical CO2 may have a temperature of about 250° C. to about 280° C. and a pressure of at least about 225 bar.

In some embodiments, the method comprises, after or during the processing of the substance, depositing a foulant on at least a portion of the first object, thereby producing a fouled first object. The foulant can be any suitable foulant and typically is a component of the substance (e.g., a composition) or a by-product of the processed substance that can be preferentially or selectively precipitated and/or deposited as a result of processing the substance. In a preferred embodiment, the foulant comprises or is lignin, a polyfuran, a protein, a saccharide (e.g., a recalcitrant xylan and/or glucan saccharide), a resin, a plastic, a decomposed form thereof, a denatured form thereof, a degraded form thereof, a charred form thereof, or any combination thereof. In some aspects, the protein is a protein found in milk, such as a casein (e.g., α-51-casein, α-s2-casein, β-casein, and 6-casein) and/or a whey protein (e.g., β-lactoglobulin, α-lactalbumin, immunoglobulin, and serum albumin). In another preferred embodiment, the foulant comprises or is lignin. In some embodiments, the substance is the same as the foulant (e.g., lignin).

In some embodiments, the method comprises processing a substance in a vessel in the presence of a first object. As used herein, processing a substance refers to any suitable manipulation of the substance which facilitates directed fouling in accordance with the methods disclosed herein. In some embodiments, the manipulation of the substance can be mechanical in nature (e.g., mixing), chemical in nature (e.g. chemical reaction), or a combination thereof.

In an embodiment, one or more chemical reactions take place during the processing of the substance. The chemical reaction can be, for example, hydrolysis, oxidation, reduction, alkylation, deprotonation, electrophilic addition, hydrogenation, esterification, elimination reaction, nucleophilic substitution, radical substitution, or a rearrangement reaction. In one embodiment, the chemical reaction is a hydrolysis reaction (e.g., acid hydrolysis, base hydrolysis, thermal hydrolysis, or enzymatic hydrolysis). In some embodiments, a denaturing process (e.g., protein denaturing) takes place during the processing of the substance. In some embodiments, a biological process takes place during the processing of the substance (e.g., a microbial process such as fermentation, and/or saccharification and fermentation (SSF)).

Typically, the processing of a substance comprises modifying one or more conditions in the vessel that facilitate the fouling (e.g., to increase the rate and/or degree of fouling). For example, the condition that is changed or modified within the vessel to facilitate the depositing can be pH adjustment (e.g., increased or decreased), salt addition, salt removal, temperature change (e.g., heating or cooling), pressure change (e.g., increasing or decreasing the pressure), zeta potential change, addition or removal of a fluid (e.g., a solvent), concentration change, or any combination thereof.

The pH adjustment can be any suitable pH adjustment which facilitates the depositing of the foulant. Typically, the pH adjustment comprises lowering the pH from an initial condition, that is, making the solution/mixture more acidic (e.g., adding one or more acids to a mixture comprising the substance for an acid hydrolysis reaction). In some embodiments, autohydrolysis results in the cleavage of acetate groups, thereby forming acetic acid that lowers the pH.

As known to the skilled artisan, the zeta potential is an indicator of the stability of colloidal dispersions. The magnitude of the zeta potential indicates the degree of electrostatic repulsion between adjacent, similarly charged particles in a dispersion. For molecules and particles that are small enough, a high zeta potential will confer stability, that is, the solution or dispersion will resist aggregation. When the potential is small, attractive forces may exceed this repulsion and the dispersion may break and flocculate. Colloids with high zeta potential (negative or positive) are electrically stabilized while colloids with low zeta potentials tend to coagulate or flocculate. For example, a zeta potential (mV) of from 0 to about ±5 indicates rapid coagulation; from about ±10 to about ±30 indicates incipient instability; from about ±30 to about ±40 indicates moderate stability; from ±40 to about ±60 indicates good stability; and greater than about ±61 indicates excellent stability.

Alternately, or in addition, the salt concentration can be changed (e.g., salt addition or salt removal, thereby changing the ionic strength) in any suitable manner which facilitates the depositing of the foulant. Similarly, the temperature, pressure, and zeta potential can be changed during the processing of a substance, as can the concentration of the mixture containing the sub stance.

In an embodiment, the processing of the substance is performed at a first temperature, and the first surface has a second temperature. For example, the first and second temperatures can be selected to facilitate deposition of the foulant.

In a preferred embodiment, the first temperature and the second temperature are substantially the same. As used herein, substantially the same temperature refers to the first and second temperatures being within about 10% of each other. Alternatively, the first and second temperatures may differ by less than about 50%, for example, the first and second temperature are within about 40% of each other, within about 30% of each other, within about 20% of each other, within about 10% of each other, within about 5% of each, or within about 1% of each other. Thus, it is desirable that the first object does not substantially function as a heat exchanger. When referring to relative temperatures in terms of percent, the temperatures are in Celsius, and the percentages are calculated relative to the lower temperature (i.e., a temperature of 100° C. and a temperature of 110° C. are within 10% of each other).

The first and second temperatures independently typically are about 100° C. or more, e.g., about 110° C. or more, about 115° C. or more, about 120° C. or more, about 125° C. or more, about 130° C. or more, about 135° C. or more, about 140° C. or more, about 145° C. or more, about 150° C. or more, about 155° C. or more, about 160° C. or more, about 165° C. or more, about 170° C. or more, about 175° C. or more, about 180° C. or more, about 185° C. or more, about 190° C. or more, about 195° C. or more, about 200° C. or more, about 205° C. or more, about 210° C. or more, about 215° C. or more, about 220° C. or more, about 225° C. or more, about 230° C. or more, about 235° C. or more, about 240° C. or more, about 245° C. or more, about 250° C. or more, about 255° C. or more, about 260° C. or more, about 265° C. or more, about 270° C. or more, about 275° C. or more, about 280° C. or more, about 285° C. or more, about 290° C. or more, about 295° C. or more, about 300° C. or more, about 305° C. or more, about 310° C. or more, about 315° C. or more, about 320° C. or more, about 325° C. or more, about 330° C. or more, about 335° C. or more, about 340° C. or more, about 345° C. or more, about 350° C. or more, about 355° C. or more, about 360° C. or more, about 365° C. or more, about 370° C. or more, about 375° C. or more, about 380° C. or more, about 385° C. or more, about 390° C. or more, about 395° C. or more, about 400° C. or more, about 405° C. or more, about 410° C. or more, about 415° C. or more, about 420° C. or more, about 425° C. or more, about 430° C. or more, about 435° C. or more, about 440° C. or more, about 445° C. or more, or about 450° C. or more.

While the maximum temperature for the first and second temperatures is not particularly limited, it is desirable that the maximum temperatures are such that the substance and/or other components present do not degrade. The maximum temperatures independently typically are less than about 460° C., e.g., less than about 455° C., less than about 450° C., less than about 445° C., less than about 440° C., less than about 435° C., less than about 430° C., less than about 425° C., less than about 420° C., less than about 415° C., less than about 410° C., less than about 405° C., less than about 400° C., less than about 395° C., less than about 390° C., less than about 385° C., less than about 380° C., less than about 375° C., less than about 370° C., less than about 365° C., less than about 360° C., less than about 355° C., less than about 350° C., less than about 345° C., less than about 340° C., less than about 335° C., less than about 330° C., less than about 325° C., less than about 320° C., less than about 315° C., less than about 310° C., less than about 305° C., less than about 300° C., less than about 295° C., less than about 290° C., less than about 285° C., less than about 280° C., less than about 275° C., less than about 270° C., less than about 265° C., less than about 260° C., less than about 255° C., less than about 250° C., less than about 245° C., less than about 240° C., less than about 235° C., less than about 230° C., less than about 225° C., less than about 220° C., less than about 215° C., less than about 210° C., less than about 205° C., less than about 200° C., less than about 195° C., less than about 190° C., less than about 185° C., less than about 180° C., less than about 175° C., less than about 170° C., less than about 165° C., less than about 160° C., less than about 155° C., less than about 150° C., less than about 145° C., less than about 140° C., less than about 135° C., less than about 130° C., less than about 125° C., less than about 120° C., less than about 115° C., less than about 110° C., or less than about 105° C.

These lower and upper limits with respect to the first and second temperatures can be used in any combination to independently describe the temperature range of the first and second temperatures.

In one embodiment, the first and second temperatures are at least about 110° C. In another embodiment, the first and second temperatures are at least about 140° C., at least about 350° C., at least about 374° C., at least about 450° C., or about 120 to about 180° C.

In some embodiments, the processing can be performed at any suitable pressure, for example, at atmospheric pressure or above. For example, the pressure can be at least about 1 bar, e.g., at least about 5 bar, at least about 10 bar, at least about 15 bar, at least about 20 bar, at least about 25 bar, at least about 30 bar, at least about 35 bar, at least about 40 bar, at least about 45 bar, at least about 50 bar, at least about 55 bar, at least about 60 bar, at least about 70 bar, at least about 80 bar, at least about 90 bar, at least about 100 bar, at least about 125 bar, at least about 150 bar, at least about 175 bar, at least about 200 bar, at least about 225 bar, at least about 250 bar, at least about 275 bar, or at least about 300 bar. The maximum pressure is not particularly limited, but may be less than about 300 bar, e.g., less than about 275 bar, less than about 250 bar, less than about 225 bar, less than about 200 bar, less than about 175 bar, less than about 150 bar, less than about 125 bar, less than about 100 bar, less than about 90 bar, less than about 80 bar, less than about 70 bar, less than about 60 bar, less than about 55 bar, less than about 50 bar, less than about 45 bar, less than about 40 bar, less than about 35 bar, less than about 30 bar, less than about 25 bar, less than about 20 bar, less than about 15 bar, less than about 10 bar, or less than about 5 bar. These lower and upper limits with respect to the pressure can be used in any combination to describe the pressure range used during processing. In some embodiments, the pressure corresponds to the saturated vapor pressure of the liquid present at the first temperature. In some embodiments, the pressure is sufficient to keep most or all of any fluid present in liquid form.

In some embodiments, fouling can be facilitated by changing the pressure during the processing. The pressure change can be effected by use of, e.g., a flash tank, a pump, a piston, or any combination thereof. In some embodiments, the pressure can be changed by at least about 5%, e.g., at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 95%, or at least about 100%, relative to the initial pressure. Alternatively, or in addition, the pressure can be changed by less than about 100%, e.g., less than about 95%, less than about 90%, less than about 85%, less than about 80%, less than about 75%, less than about 70%, less than about 65%, less than about 60%, less than about 55%, less than about 50%, less than about 45%, less than about 40%, less than about 35%, less than about 30%, less than about 25%, less than about 20%, less than about 15%, less than about 10%, or less than about 5%, relative to the initial pressure. Any two of the foregoing endpoints can be combined to describe a pressure change range. For example, the pressure change can be about 10% to about 50%, relative to the initial pressure.

In some embodiments, the method comprises processing a substance in a vessel. The vessel can be any suitable vessel for processing a substance in accordance with the invention such as a tank (e.g., a continuous stirred tank reactor (CSTR)), a drum, a tubular reactor, or a digester (e.g., vertical, horizontal, or inclined). Although the vessel is not particularly limited, the vessel typically has an inner surface, in which at least a portion of the inner surface has a first propensity to foul, and the propensity to foul is lower than the propensity (i.e., the second propensity) of fouling the surface of the first object. Typically, at least a portion of the inner surface comprises a material with a low surface roughness (Ra) (e.g., a relatively smooth surface). In some embodiments at least 50%, e.g., at least 60%, at least 70%, at least 80%, at least 90%, at least 99%, or 100% of the inner surface of the vessel has a first propensity to foul, in which the first propensity is lower than the second propensity (i.e., the second propensity is the propensity of the first surface to foul).

The inner surface of the vessel typically has an average surface roughness (Ra).

Surface roughness is a component of surface texture, and is quantified by the vertical deviations of an actual surface from its ideal form with large deviations typically indicating a "rough" surface. In the context of the methods disclosed herein, the Ra can be measured using any suitable method. For example, surface roughness can be measured by manual comparison against a "surface roughness comparator," a sample of known surface roughness, but more generally a surface profile measurement can be made with a profilometer that can be a contact type (typically a diamond styles) or an optical type (e.g. a white light interferometer).

In some embodiments, at least a portion of the inner surface has a lower surface roughness than the first surface of the first object. Without wishing to be bound by theory, it is contemplated that the lower surface roughness, potentially in combination with the surface material, correlate to the propensity for fouling. In other words, a low surface roughness typically corresponds to a lower propensity of fouling.

The inner surface material can comprise, e.g., glass, electropolished metal, polytetrafluoroethylene (including polished polytetrafluoroethylene), and any combination thereof. In some embodiments, at least a portion of the inner surface comprises glass.

As known to a person of ordinary skill in the art, polytetrafluoroethylene (PTFE) is a solid, high molecular weight synthetic fluoropolymer of tetrafluoroethylene having numerous applications as a coating and an additive (e.g., non-stick coatings, as a lubricant, as a graft material in surgery, etc.). PTFE is well-known under the trademark TEFLON® owned by DuPont (Wilmington, Del.).

In some embodiments, the manner in which the method is conducted is not particularly limited. For example, the method can be conducted in continuous mode, batch mode, or semi-batch mode. As used herein, a continuous process refers to a process which is uninterrupted for its duration, or interrupted, paused or suspended only momentarily relative to the duration of the process. Processing of the substance is "continuous" when the substance is processed and/or the foulant is deposited onto the first surface without interruption or without a substantial interruption, or processing/depositing of the foulant is not done in a batch process. In "batch" mode or "semi-batch" mode, steps of the process may be conducted sequentially, simultaneously, or a combination of both.

The method comprises processing a substance in a vessel in the presence of one or more first objects. The first object can be any suitable object, such as, e.g., an impeller, mixer blade, paddle, rod, tube, or any combination thereof. The first surface of the first object can be comprised of any suitable material, so long as the material has a higher propensity for fouling relative to the propensity for fouling the inner surface of the vessel. In an embodiment, the first surface comprises a metal (e.g., a base metal, a ferrous metal, a noble metal, or a precious metal). Examples of a suitable metal include iron, copper, lead, zinc, nickel, chromium, palladium, platinum, gold, silver, aluminum, steel, titanium, alloys of any of the foregoing, and combinations thereof. In one embodiment, the metal is an austenitic metal, a metal having a nickel content of at least about 20 wt %, a super alloy (e.g., a metal comprising HASTELLOY™ alloy), a metal comprising steel, or any combination thereof. In some embodiments, the first object can comprise at least a portion of the inner surface of the vessel.

As known to a person of ordinary skill in the art, austenitic metal refers to an allotrope of stainless steel containing high amounts of chromium and nickel, and sometimes molybdenum and nitrogen. Austenitic metals are corrosion resistant, ductile, and weldable. Exemplary austenitic metals include 300 series stainless steels (e.g., types 304, 308, 309, 310, 312, and 316, including 316L and 316N).

The metal can also have a nickel content of at least about 20 wt % (e.g., at least about 25 wt %, at least about 30 wt %, at least about 35 wt %, at least about 40 wt %, at least about 45 wt %, at least about 50 wt %, at least about 55 wt %, at least about 60 wt %, at least about 65 wt %, at least about 70 wt %, at least about 75 wt %, at least about 80 wt %, at least about 85 wt %, at least about 90 wt %, or at least about 95 wt %). The metal can comprise other components, such as a metal and/or non-metal, as set forth herein. For example, the metal can further comprise steel, iron, aluminum, chromium, and/or titanium.

As used herein, a "super alloy" is also known as a "high performance alloy" and is an alloy with high mechanical strength and surface stability plus corrosion and oxidation resistance. A super alloy typically comprises nickel, cobalt, or nickel-iron and has an austenitic face-centered cubic crystal structure. Additional components can be included, such as chromium, iron, cobalt, molybdenum, tungsten, tantalum, aluminum, titanium, zirconium, niobium, rhenium, yttrium, vanadium, carbon, boron, or hafnium.

As is appreciated by a person of ordinary skill in the art, an example of a super alloy is HASTELLOY™ alloy, which is the registered trademark of Haynes International, Inc. (Kokomo, Ind.) and refers to a range of highly corrosion-resistant metal alloys. The metal alloys are primarily based on nickel and include varying amounts of other alloying ingredients (e.g., molybdenum, chromium, cobalt, iron, copper, manganese, titanium, zirconium, aluminum, carbon, and tungsten) depending on the intended use. The primary benefit of the high performance alloys is that of effective survival under high-temperature, high-stress service in a moderately to severely corrosive, and/or erosion-prone environment where more common and less expensive iron-based alloys typically fail.

Other illustrative HASTELLOY™ alloys include HASTELLOY™ B alloys, HASTELLOY™ N alloys HASTELLOY™ S alloys, HASTELLOY™ W alloys, HASTELLOY™ X alloys, HASTELLOY™ B-3™ alloys, HASTELLOY™ C-22™ alloys, HASTELLOY™ C-276 alloys, HASTELLOY™ C2000™, HASTELLOY™ G-30™ alloys, HASTELLOY™ C-4 alloys, HASTELLOY™ G-35™ alloys, and HASTELLOY™ C-22HS™ alloys, as described in the Haynes International Product Line Brochure (H-1069) (accessed on Feb. 9, 2015 and available at http://www.haynesintl.com/pdf/h1069.pdf), which is incorporated by reference in its entirety herein.

HASTELLOY™ B alloys contain approximately 67% Ni, 28% Mo, 5% Fe, 0.3% V, 2.5% Co, 1% Cr, 1% Mn, 1% Si, 0.5% Cu, and 0.05% C.

HASTELLOY™ N alloys contain approximately 71% Ni, 16% Mo, 7% Cr, 5% Fe, 1% Si, 0.8% Mn, 0.5% W, 0.5% (Al+Ti), 0.35% Cu, 0.2% Co, and 0.08% C.

HASTELLOY™ S alloys contain approximately 67% Ni, 16% Cr, 15% Mo, 0.5% Mn, 0.4% Si, 0.25% Al, 0.02% La, 3% Fe, 2% Co, 1% W, 0.02% C, and 0.015% B.

HASTELLOY™ W alloys contain approximately 63% Ni, 24% Mo, 6% Fe, 5% Cr, 2.5% Co, 1% Mn, 1% Si, 0.6% V, and 0.12% C.

HASTELLOY™ X alloys contain approximately 47% Ni, 22% Cr, 18% Fe, 9% Mo, 1.5% Co, 0.6% W, 0.1% C, 1% Mn, 1% Si, and 0.008% B.

HASTELLOY™ B-3™ alloys contain approximately 65% Ni, 28.5% Mo, 1.5% Cr, 1.5% Fe, 3% Co, 3% Mn, 3% W, 0.5% Al, 0.2% Ti, 0.1% Si, and 0.01% C.

HASTELLOY™ C-22™ alloys contain approximately 56% Ni, 22% Cr, 13% Mo, 3% Fe, 3% W, 2.5% Co, 0.5% Mn, 0.35% V, 0.08% Si, and 0.01% C.

HASTELLOY™ C-276 alloys contain approximately 57% Ni, 16% Cr, 16% Mo, 5% Fe, 4% W, 2.5% Co, 1% Mn, 0.35% V, 0.08% Si, and 0.01% C.

HASTELLOY™ C-2000™ alloys contain approximately 59% Ni, 23% Cr, 16% Mo, 1.6% Cu, 0.08% Si, and 0.01% C.

HASTELLOY™ G-30™ alloys contain approximately 43% Ni, 30% Cr, 15% Fe, 5.5% Mo, 2.5% W, 5% Co, 2% Cu, 1.5% Cb, 1.5% Mn, 1% Si, and 0.03% C.

HASTELLOY™ C-4 alloys contain approximately 65% Ni, 16% Cr, 16% Mo, 0.7% Ti, 3% Fe, 2% Co, 1% Mn, 0.08% Si, and 0.01% C.

HASTELLOY™ G-35™ alloys contain approximately 58% Ni, 33.2% Cr, 8.1% Mo, 2% Fe, 0.6% Si, 0.3% Cu, and 0.05% C.

HASTELLOY™ C-22HS™ alloys contain approximately 61% Ni, 21% Cr, 17% Mo, 2% Fe, 1% W, 0.08% Si, and 0.01% C.

In some embodiments, the propensity of a given surface to foul can be adjusted by controlling the environment at the given surface. In such a situation, the first surface and the inner surface (or portions thereof) can be made of identical materials, or can be made of different materials, as described elsewhere herein, but the environment at the inner surface can be controlled such that at least a portion of the first surface fouls more than at least a portion of the inner surface. For example, at least a portion of the inner surface can be exposed to a higher shear environment (e.g., a higher flow velocity of the substance or a mixture containing the substance) than at least a portion of the first surface, such that the higher shear environment at the inner surface prevents fouling from occurring to the same extent on the inner surface compared to the first surface. Shear can be controlled by, e.g., mixing speed, distance from the center of a stirred mixture, diameter of tubing, radius of a flow path (e.g., diameter of a cyclone), or any combination thereof. In some embodiments, the flow can be pulsed to create different shear environments. In some embodiments, at least a portion of the inner surface can be at a different temperature than at least a portion of the first surface (e.g., a higher or lower temperature than the first surface). In some embodiments, at least a portion of the inner surface is subjected to different frequency vibrations (e.g., higher or lower frequency vibrations) compared to at least a portion of the first surface. In some embodiments, at least a portion of the inner surface has a different electric potential compared to at least a portion of the first surface. In some embodiments, any of the foregoing environments for the inner surface and the first surface can be combined in any desirable manner.

The first object has a first surface. Although not particularly limited, the shape of the first surface can be any suitable shape which facilitates the processing of the substance, including the depositing of the foulant. In a preferred embodiment, the shape is selected from the group consisting of polygonal, plate-like, disc-like, spherical, substantially flat, concave, convex, fractal, tube-like, any portion thereof, and any combination thereof.

In some embodiments, a plurality of first objects are present during the processing of the substance, each of which can be the same or different. In some embodiments, each of the first objects is the same. In some embodiments, each of the first objects is not the same.

In some embodiments, the first object is capable of being removed from the vessel to enable cleaning and/or removing the foulant from the surface of the object. In some embodiments, the first object is permanently affixed to the vessel and cannot be quickly or easily removed. In some embodiments, at least a portion of the foulant is cleaned from the fouled first object using a suitable method, e.g., mechanical (e.g., scraping, squeegeeing), combusting, heating, chemical washing, vibration, sonics, ultrasonics, shock, a flowing fluid, a flowing solid, or any combination thereof. The cleaning of the first object can be performed within the vessel (e.g., in situ during the processing, and/or after processing has stopped) or outside the vessel (e.g., while processing is still occurring, or after the processing has stopped). Accordingly, it is appreciated that the fouled first object can be replaced with an unfouled (e.g., clean) first object during the processing of the substance and/or a cleaned first object can be reinserted into the vessel for further processing.

In some embodiments, during cleaning the foulant can be formed into one or more three-dimensional masses on the first surface. The method by which the three-dimensional masses are formed is selected from the group consisting of shearing, scraping, physically contacting the foulant, and any combination thereof. The three dimensional masses can be, e.g., globules, spheres, balls, flakes, droplets, or any combination thereof.

In some embodiments one or more of three-dimensional masses of the foulant are collected. For example, the foulant can be removed from the vessel.

In an aspect, an apparatus is provided which is suitable for the directed fouling of a substance onto a selected surface as described herein. The apparatus comprises a vessel having an inner surface, wherein at least a portion of the inner surface has a first propensity to foul, and a first object having a first surface. At least a portion of the first object is located within the vessel, and at least a portion of the first surface has a second propensity to foul. To provide a directed fouling of the first object, the first propensity is lower than the second propensity.

The vessel, inner surface, first object, first surface, and propensity for fouling are as described herein.

In some embodiments the apparatus can further comprise a cleaning device capable of removing at least a portion of a foulant when disposed on the first surface. The apparatus can further comprise a cleaning means for cleaning at least a portion of a foulant when disposed on the first surface. Suitable cleaning means can include, for example, a scraper, a combuster, a heater, a chemical, a vibrator, a shocker (i.e., a device that imparts a sudden shock, such as a mechanical shock to the fouled object to remove the fouling), a flowing fluid, a flowing solid, and any combination thereof. Alternatively, the first object can be removed from the vessel to enable cleaning, and any of the disclosed cleaning means can be used to clean the first object during and/or upon removal from the vessel. Cleaning means are not considered to be "suitable" when the foulant is not removed to a suitable extent (e.g., greater than 20% by surface area of the first object, e.g., greater than 30%, greater than 40%, greater than 50%, greater than 60%, greater than 70%, greater than 80%, or greater than 90% by surface area of the first object). For example, if the fouled first object is present in a flowing fluid, but the flowing fluid does not remove the foulant to a suitable extent, then the flowing fluid is not a suitable cleaning means.

The following example further illustrates the invention but, of course, should not be construed as in any way limiting its scope.

EXAMPLE

This example demonstrates a method of processing a glucose oligomer solution (GOS) in accordance with the methods disclosed herein.

A glucose oligomer solution (GOS) was formed in accordance with the following method. An aqueous slurry of size-reduced biomass was subjected to a temperature of about 200-250° C. for a period of about 1-8 min under a pressure sufficient to keep all of the fluid in liquid form (generally less than about 50 bar). The resulting mixture was filtered, the solids re-slurried with water, and the slurry subjected to a temperature of about 350-400° C. for a period of less than about 10 sec under a pressure sufficient to keep all of the fluid in liquid or supercritical form (generally less than about 250 bar). The resulting mixture was filtered, and the liquid fraction concentrated to about 15-30% total dissolved solids.

Figure 1:
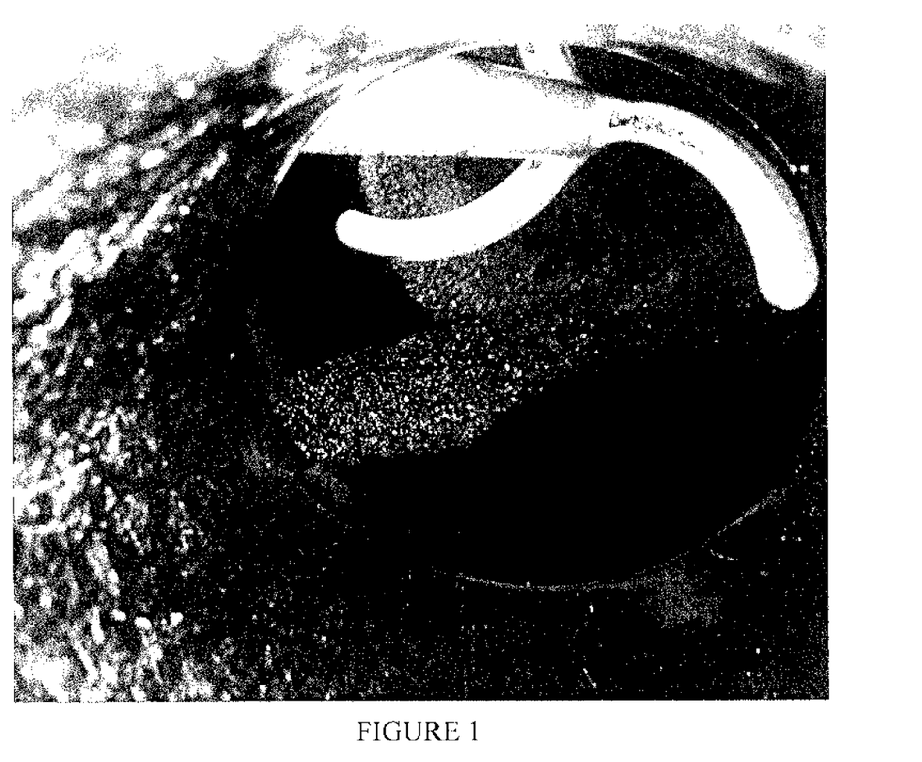
FIG. 1 is a photograph showing that, after the completion of a hydrolysis reaction, a HASTELLOY™ alloy tube inserted into a glucose oligomer solution (GOS) in a glass-lined reactor was coated with a substantial amount of the fouling material.
Figure 2:
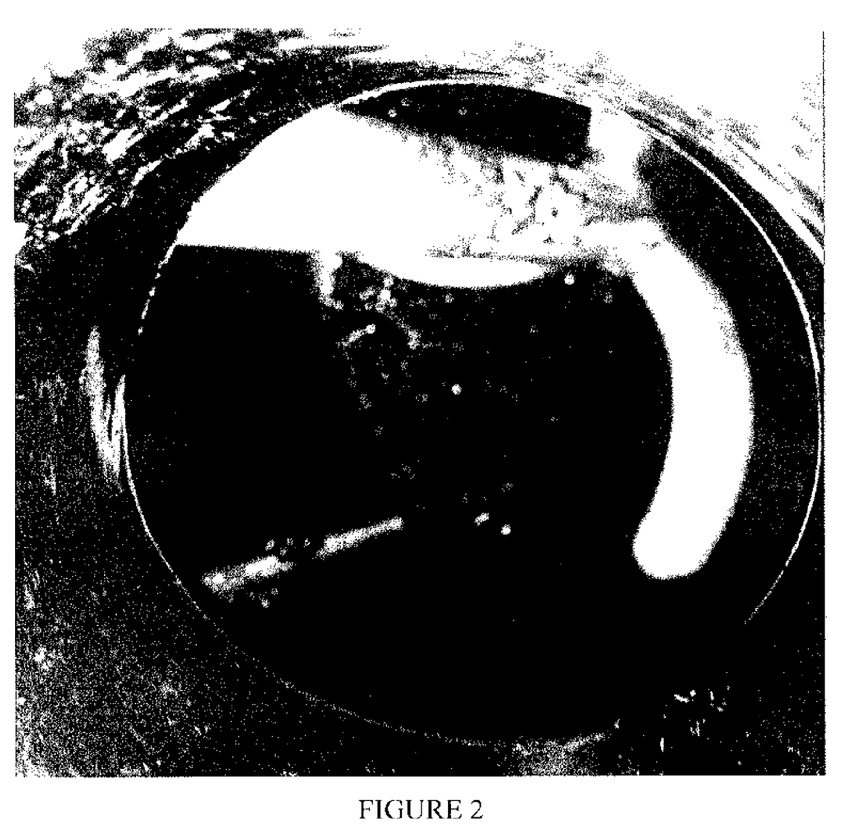
FIG. 2 is a photograph showing a HASTELLOY™ alloy tube that was fouled in a glass-lined reaction vessel after completion of a hydrolysis reaction, removed from the reaction vessel, scraped clean, and reinserted into the reaction vessel for further processing.

A hydrolysis reaction was performed in a 100 L glass lined reactor available from Pfaulder (Rochester, N.Y.) and equipped with a glass impeller. A piece of HASTELLOY™ alloy tubing of ⅜" diameter (about 1 cm) was inserted through the top port of the reactor such that approximately 1 foot (about 30 cm) of the tubing was immersed in the liquid. GOS (100 kg) containing about 18-25% total dissolved solids was added to the reactor along with 0.25 kg sulfuric acid (and 1 kg water to chase the lines). The reactor was heated to about 140° C. for about 5 hours and then cooled. When the reactor was opened, the HASTELLOY™ alloy tube was completely coated with a substantial amount of the reaction precipitate (foulant). See FIG. 1. The tube was removed from the reactor and scraped to remove the foulant. The cleaned tube was reinserted into the reactor vessel to continue the processing. See FIG. 2.

The results demonstrate that GOS obtained from an aqueous slurry of size-reduced biomass can be processed using the methods disclosed herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke means plus function treatment for any limitations of any of the claims herein, except for those in which the claim expressly uses the words "means for" together with an associated function.

The invention claimed is:

1. A method comprising:
providing a vessel having an inner surface;
processing a substance in the vessel in the presence of a first object having a first surface;
depositing a foulant on at least a portion of the first surface during the processing, wherein the foulant comprises lignin or a polyfuran, thereby producing a fouled first object; and
cleaning at least a portion of the foulant from the fouled first object;
wherein:
at least a portion of the inner surface has a first propensity to foul;
at least a portion of the first surface has a second propensity to foul; and
the first propensity is lower than the second propensity.

2. The method of claim 1, wherein a chemical reaction takes place during the processing.

3. The method of claim 1, wherein a condition is changed within the vessel to facilitate the depositing.

4. The method of claim 3, wherein the condition is pH adjustment, salt addition, salt removal, temperature change, pressure change, zeta potential change, addition of solvent, removal of solvent, concentration change, or any combination thereof.

5. The method of claim 1, wherein the substance is selected from the group consisting of biomass, an oligosaccharide, a polysaccharide, lignin, food, and any combination thereof.

6. The method of claim 1, wherein the cleaning comprises scraping, combusting, heating, chemical washing, vibration, shock, a flowing fluid, a flowing solid, or any combination thereof.

7. The method of claim 6, wherein the fouled first object is removed from the vessel prior to the cleaning.

8. The method of claim 6, wherein the cleaning is performed within the vessel.

9. The method of claim 1, wherein during the cleaning, the foulant is formed into one or more three-dimensional masses on the first surface of the first object by way of shearing, scraping, and/or physically contacting the foulant, and wherein the one or more three-dimensional masses of the foulant optionally are collected.

10. The method of claim 1, wherein at least a portion of the first surface comprises a metal.

11. The method of claim 10, wherein the metal is selected from the group consisting of an austenitic metal, a metal having a nickel content of at least about 20 wt %, a super alloy, a metal comprising steel, and any combination thereof.

12. The method of claim 1, wherein at least a portion of the inner surface comprises a material selected from the group consisting of glass, electropolished metal, polished polytetrafluoroethylene, and any combination thereof.

13. The method of claim 1, wherein the foulant comprises lignin.

14. The method of claim 1, wherein the foulant comprises a polyfuran.

15. The method of claim 1, wherein the first surface comprises a shape selected from the group consisting of polygonal, plate-like, disc-like, spherical, substantially flat, concave, convex, fractal, tube-like, any portion thereof, and any combination thereof.

16. The method of claim 1, wherein the vessel contains a plurality of the first object, wherein each first object can be the same or different.

17. The method of claim 1, wherein at least a portion of the inner surface has a lower surface roughness than the first surface.

18. The method of claim 1, wherein the processing is performed at a first temperature, the first surface has a second temperature, and the first temperature and the second temperature are substantially the same.

19. The method of claim 1, wherein the first propensity to foul and the second propensity to foul are adjusted by controlling at least one of shear, temperature, and vibration frequency at least a portion of the inner surface or at least a portion of the first surface.

* * * * *